United States Patent
Ihlenburg

(10) Patent No.: US 12,149,867 B2
(45) Date of Patent: *Nov. 19, 2024

(54) VEHICULAR VISION SYSTEM WITH ELECTRONIC CONTROL UNIT

(71) Applicant: MAGNA ELECTRONICS INC., Auburn Hills, MI (US)

(72) Inventor: Joern Ihlenburg, Berlin (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 434 days.

This patent is subject to a terminal disclaimer.

(21) Appl. No.: 17/650,879

(22) Filed: Feb. 14, 2022

(65) Prior Publication Data

US 2022/0166956 A1 May 26, 2022

Related U.S. Application Data

(63) Continuation of application No. 16/852,657, filed on Apr. 20, 2020, now Pat. No. 11,252,376, which is a continuation of application No. 16/105,234, filed on Aug. 20, 2018, now Pat. No. 10,630,940, which is a continuation of application No. 14/195,136, filed on Mar. 3, 2014, now Pat. No. 10,057,544.

(60) Provisional application No. 61/772,015, filed on Mar. 4, 2013.

(51) Int. Cl.
*H04N 19/593* (2014.01)
*H04N 7/18* (2006.01)

(52) U.S. Cl.
CPC ..................................... *H04N 7/18* (2013.01)

(58) Field of Classification Search
CPC .............. H04N 7/18; G06F 2213/0016; A61K 9/2086; A61K 9/2095; B30B 11/08; B30B 11/085; B30B 11/34; B30B 15/0082; B30B 15/304
USPC .................................................. 348/148, 118
See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |
| 5,949,331 A | 9/1999 | Schofield et al. |
| 6,222,447 B1 | 4/2001 | Schofield et al. |

(Continued)

FOREIGN PATENT DOCUMENTS

| | | |
|---|---|---|
| FR | 2921535 A1 | 3/2009 |
| WO | 2013043661 A1 | 3/2013 |
| WO | 2013081985 A1 | 6/2013 |

*Primary Examiner* — William C Vaughn, Jr.
*Assistant Examiner* — Naod W Belai
(74) *Attorney, Agent, or Firm* — HONIGMAN LLP

(57) ABSTRACT

A vehicular vision system includes an electronic control unit disposed at a vehicle, and a camera disposed at the vehicle. The electronic control unit includes an image processor. The camera has an imager that captures image data. A cable is electrically connected (i) at an electrical connector of the electronic control unit and (ii) at an electrical connector the rear backup camera. The cable carries DC power from the electronic control unit to the camera. The cable carries, from the electronic control unit to the camera, data used for control of the imager of the respective camera. The cable carries image data captured by the imager of the camera to the electronic control unit. Image data carried by the cable to the electronic control unit is processed at the electronic control unit.

46 Claims, 15 Drawing Sheets

(56) References Cited

U.S. PATENT DOCUMENTS

| | | |
|---|---|---|
| 6,498,620 B2 | 12/2002 | Schofield et al. |
| 6,605,775 B1 | 8/2003 | Seeber et al. |
| 6,611,202 B2 | 8/2003 | Schofield et al. |
| 6,636,258 B2 | 10/2003 | Strumolo |
| 6,693,519 B2 * | 2/2004 | Keirstead ................ B60R 1/00 340/435 |
| 7,145,519 B2 | 12/2006 | Takahashi et al. |
| 7,161,616 B1 | 1/2007 | Okamoto et al. |
| 7,230,640 B2 | 6/2007 | Regensburger et al. |
| 7,248,283 B2 | 7/2007 | Takagi et al. |
| 7,295,229 B2 | 11/2007 | Kumata et al. |
| 7,301,466 B2 | 11/2007 | Asai |
| 7,381,089 B2 | 6/2008 | Hosler, Sr. |
| 7,492,626 B2 | 2/2009 | Chanussot et al. |
| 7,592,928 B2 | 9/2009 | Chinomi et al. |
| 7,859,565 B2 | 12/2010 | Schofield et al. |
| 8,090,976 B2 * | 1/2012 | Maciver ............. G06F 11/2007 714/4.11 |
| 9,041,806 B2 | 5/2015 | Baur et al. |
| 9,210,307 B2 | 12/2015 | Gebauer et al. |
| 10,057,544 B2 | 8/2018 | Ihlenburg |
| 10,630,940 B2 | 4/2020 | Ihlenburg |
| 11,252,376 B2 | 2/2022 | Hlenburg |
| 2006/0212624 A1 | 9/2006 | Kim |
| 2006/0254805 A1 | 11/2006 | Scherer et al. |
| 2007/0103313 A1 | 5/2007 | Washington |
| 2007/0236364 A1 * | 10/2007 | Hubbard ................ B60Q 9/005 340/932.2 |
| 2007/0257923 A1 * | 11/2007 | Whitby-Strevens ... G09G 5/006 345/520 |
| 2008/0063129 A1 * | 3/2008 | Voutilainen ........... H03L 7/0802 375/376 |
| 2009/0024756 A1 * | 1/2009 | Spalla ................ H04L 1/0057 709/231 |
| 2010/0097519 A1 | 4/2010 | Byrne et al. |
| 2010/0118145 A1 | 5/2010 | Betham et al. |
| 2010/0296519 A1 * | 11/2010 | Jones ................ H04L 12/4616 370/463 |
| 2012/0062743 A1 | 3/2012 | Lynam et al. |
| 2012/0069184 A1 | 3/2012 | Hottmann |
| 2012/0154591 A1 | 6/2012 | Baur et al. |
| 2012/0287140 A1 * | 11/2012 | Lin ...................... G09G 3/2096 345/520 |
| 2013/0314503 A1 | 11/2013 | Nix et al. |
| 2014/0009633 A1 * | 1/2014 | Chopra ................ H04L 7/0012 348/222.1 |
| 2014/0022390 A1 | 1/2014 | Blank et al. |
| 2014/0152778 A1 | 6/2014 | Ihlenburg et al. |
| 2014/0218535 A1 | 8/2014 | Ihlenburg et al. |
| 2014/0340510 A1 | 11/2014 | Ihlenburg et al. |
| 2014/0362209 A1 | 12/2014 | Ziegenspeck et al. |
| 2015/0042807 A1 | 2/2015 | Ihlenburg et al. |

* cited by examiner

VEHICULAR VISION SYSTEM WITH ELECTRONIC CONTROL UNIT

CROSS REFERENCE TO RELATED APPLICATIONS

The present application is a continuation of U.S. patent application Ser. No. 16/852,657, filed Apr. 20, 2020, now U.S. Pat. No. 11,252,376, which is a continuation of U.S. patent application Ser. No. 16/105,234, filed Aug. 20, 2018, now U.S. Pat. No. 10,630,940, which is a continuation of U.S. patent application Ser. No. 14/195,136, filed Mar. 3, 2014, now U.S. Pat. No. 10,057,544, which claims the filing benefits of U.S. provisional application Ser. No. 61/772,015, filed Mar. 4, 2013, which is hereby incorporated herein by reference in its entirety.

FIELD OF THE INVENTION

The present invention relates to imaging systems or vision systems for vehicles.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a vision system or imaging system for a vehicle that utilizes one or more cameras to capture images exterior of the vehicle, and provides the communication/data signals, including camera data or image data that may be displayed or processed to provide the desired display images and/or processing and control, depending on the particular application of the camera and vision or imaging system.

The present invention provides a vision system that comprises an imager for an automotive camera that has integrated physical layer components. The present invention provides image data transfer to remote image processing devices, such as to a compartment display, head unit or ECU/MCU. The data transfer system of the present invention may use one differential data line (such as via low-voltage differential signaling or LVDS), which may be bidirectional, whereby the back channel is used for control. Optionally, a monodirectional LVDS interface may be used, whereby the control channel may be embodied by a separate camera communication interface.

These and other objects, advantages, purposes and features of the present invention will become apparent upon review of the following specification in conjunction with the drawings.

DESCRIPTION OF THE PREFERRED EMBODIMENTS

A driver assist system and/or vision system and/or object detection system and/or alert system may operate to capture images exterior of the vehicle and process the captured image data to detect objects at or near the vehicle and in the predicted path of the vehicle, such as to assist a driver of the vehicle in maneuvering the vehicle in a rearward direction. The object detection may utilize detection and analysis of moving vectors representative of objects detected in the field of view of the vehicle camera, in order to determine which detected objects are objects of interest to the driver of the vehicle, such as when the driver of the vehicle undertakes a reversing maneuver.

Figure 1:
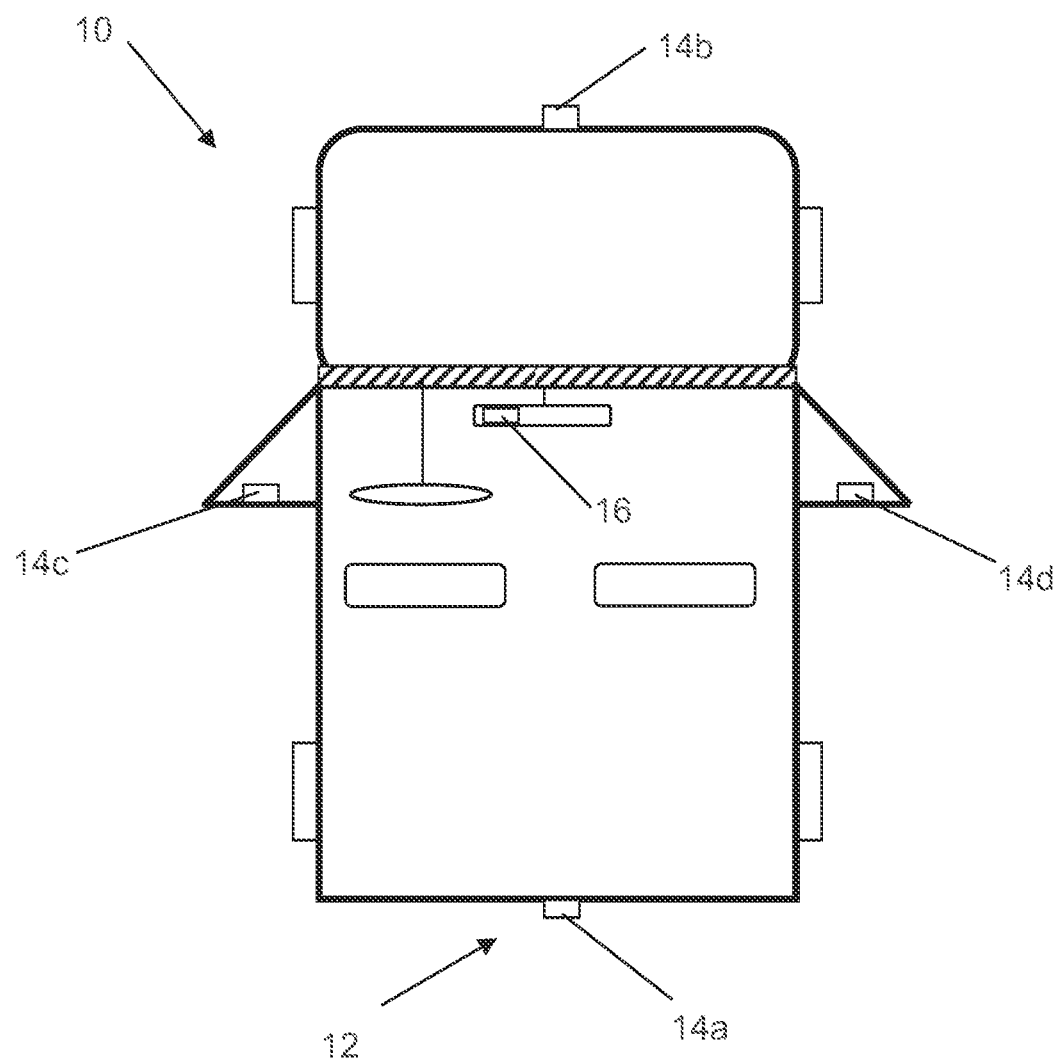
FIG. 1 is a plan view of a vehicle with a vision system and imaging sensors or cameras that provide exterior fields of view in accordance with the present invention.
Figure 2A:
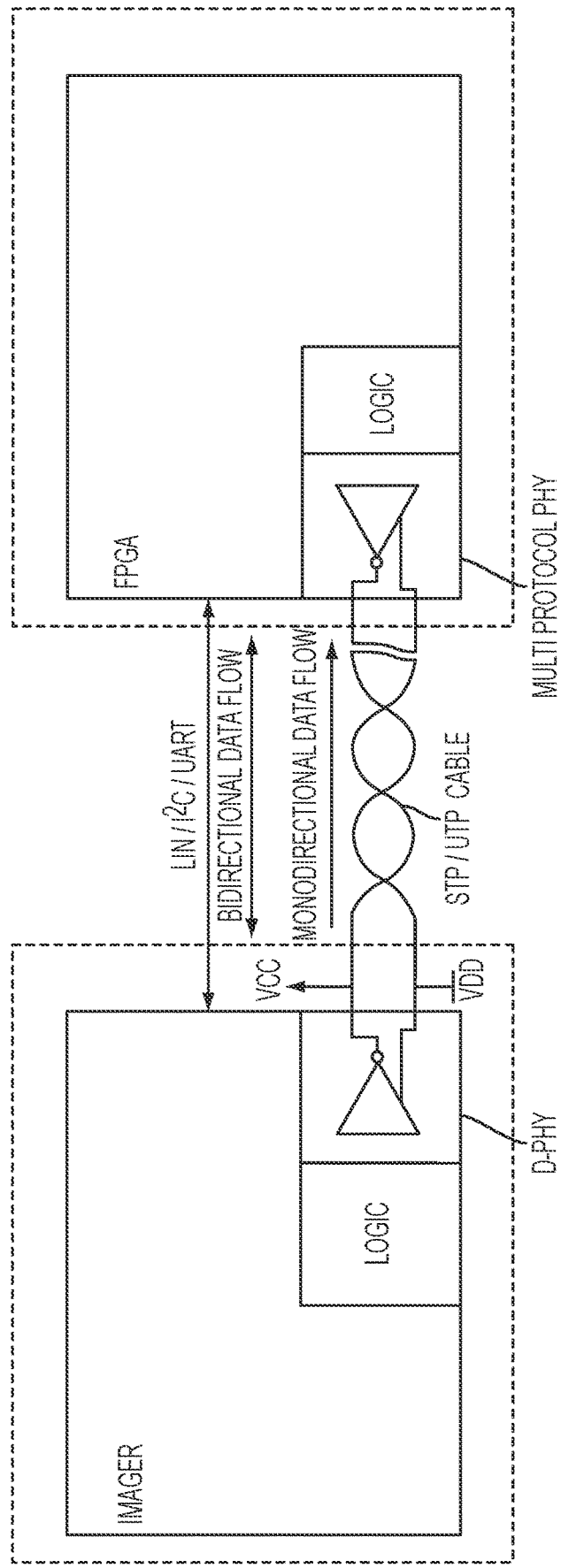
FIGS. 2A and 2B are schematics of vision system wiring connections between an imager and a processor or data receiving device comprising a twisted wire connection in accordance with the present invention.
Figure 2B:
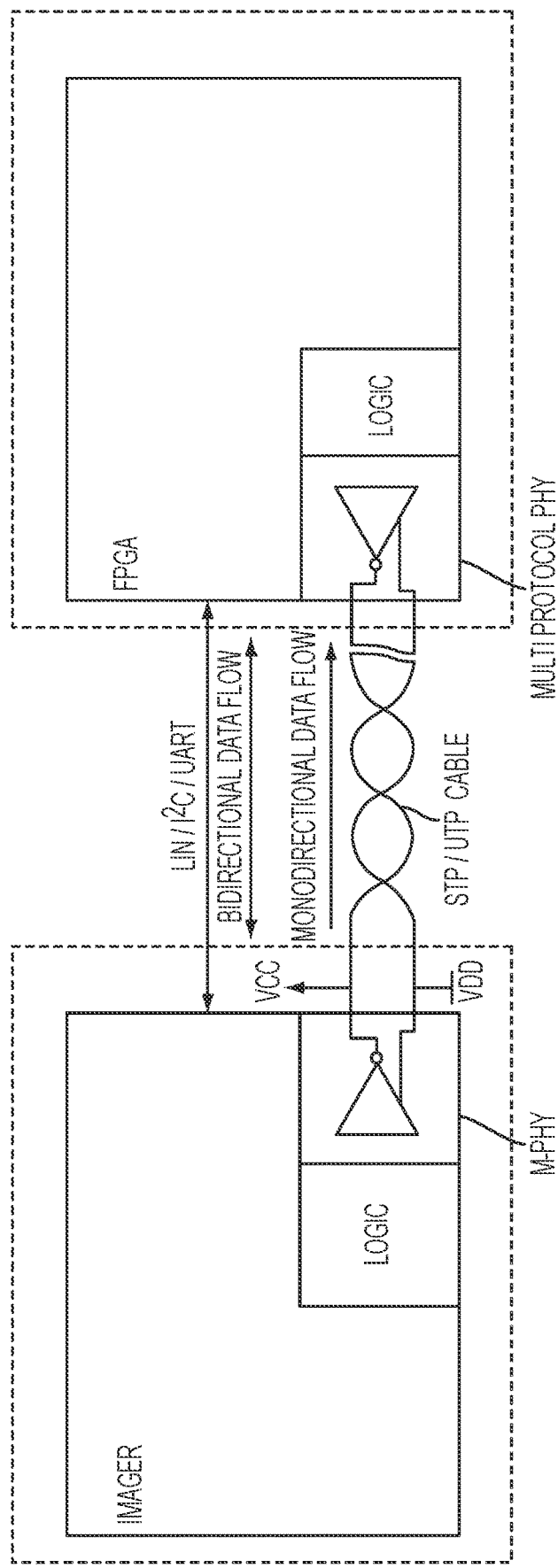
Figure 3A:
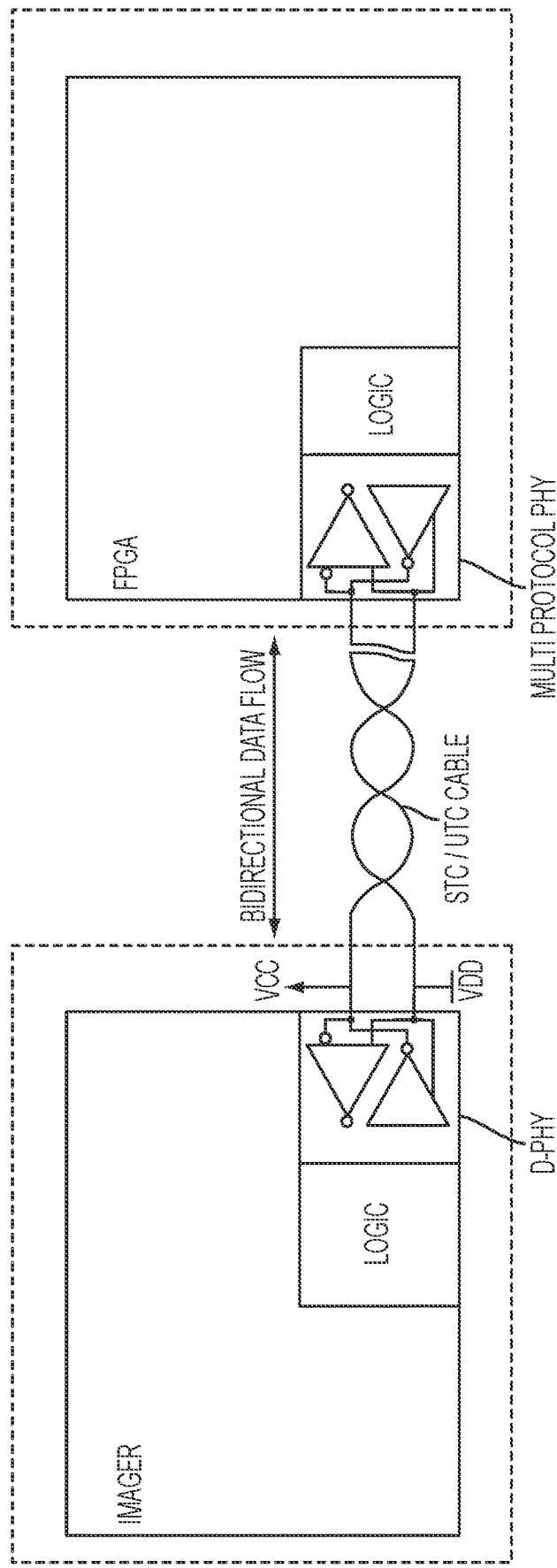
FIGS. 3A and 3B are schematics of other vision system wiring connections between an imager and a processor or data receiving device comprising a twisted wire connection in accordance with the present invention.
Figure 3B:
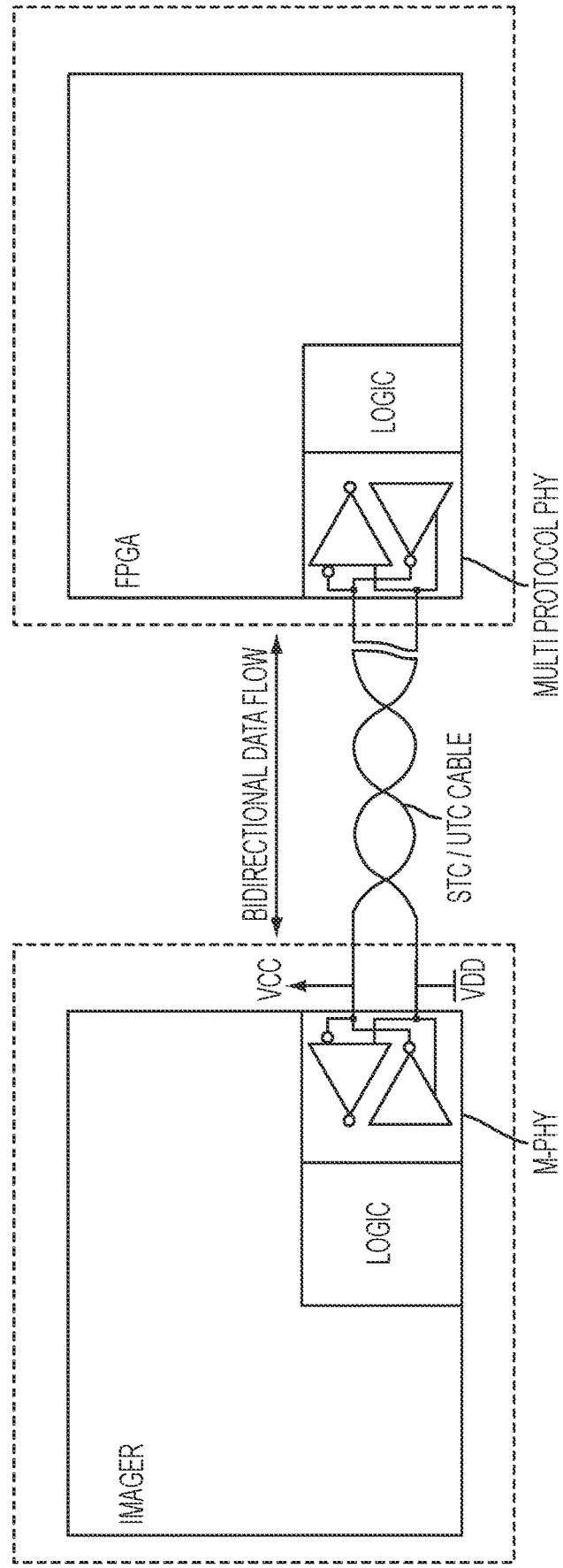
Figure 4A:
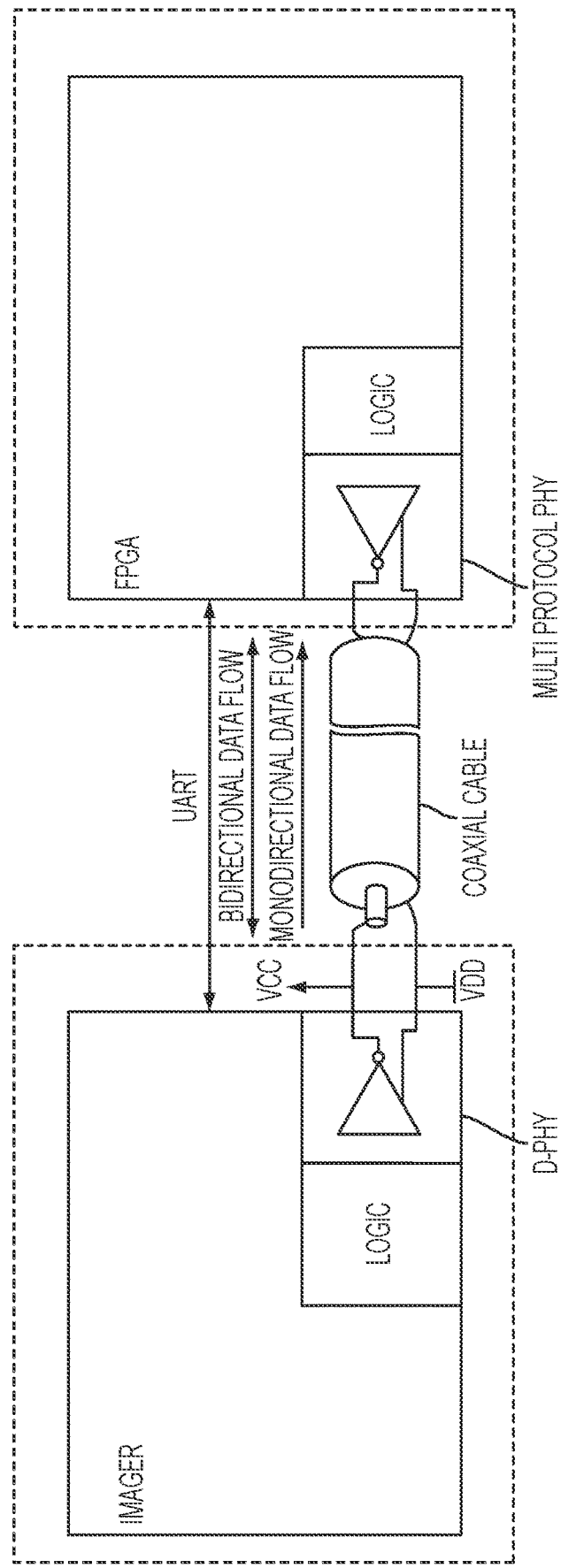
FIGS. 4A and 4B are schematics of vision system wiring connections between an imager and a processor or data receiving device comprising a coaxial cable connection in accordance with the present invention.
Figure 4B:
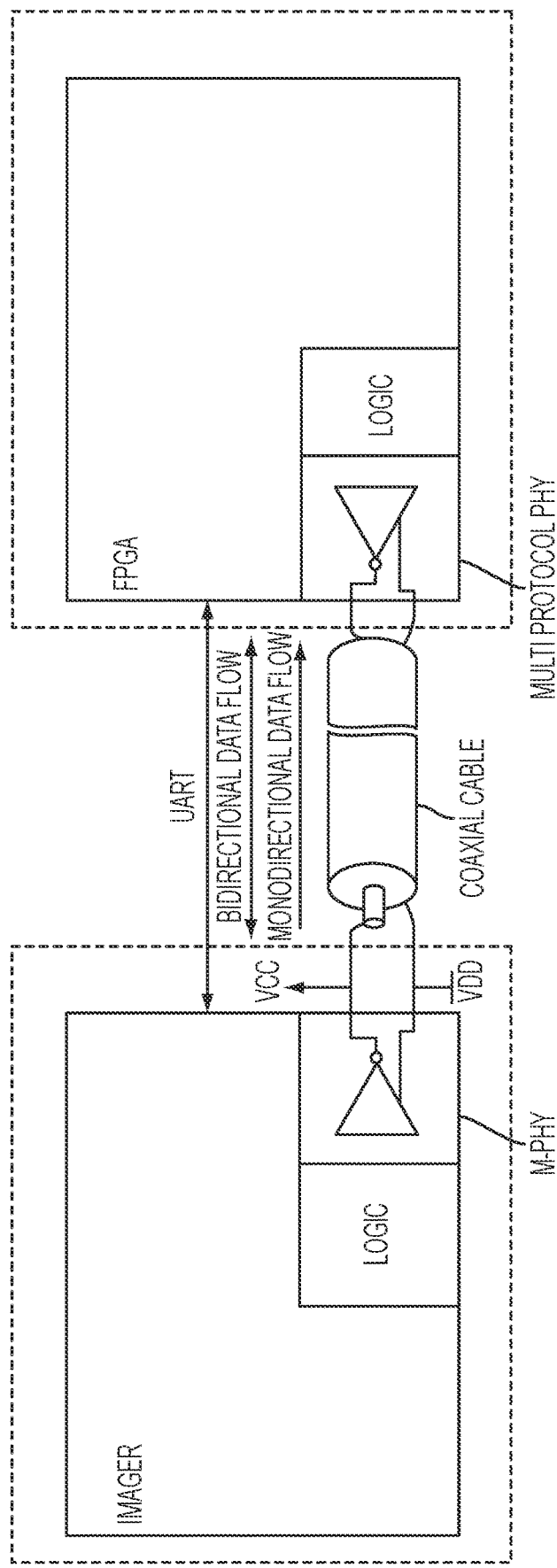
Figure 5A:
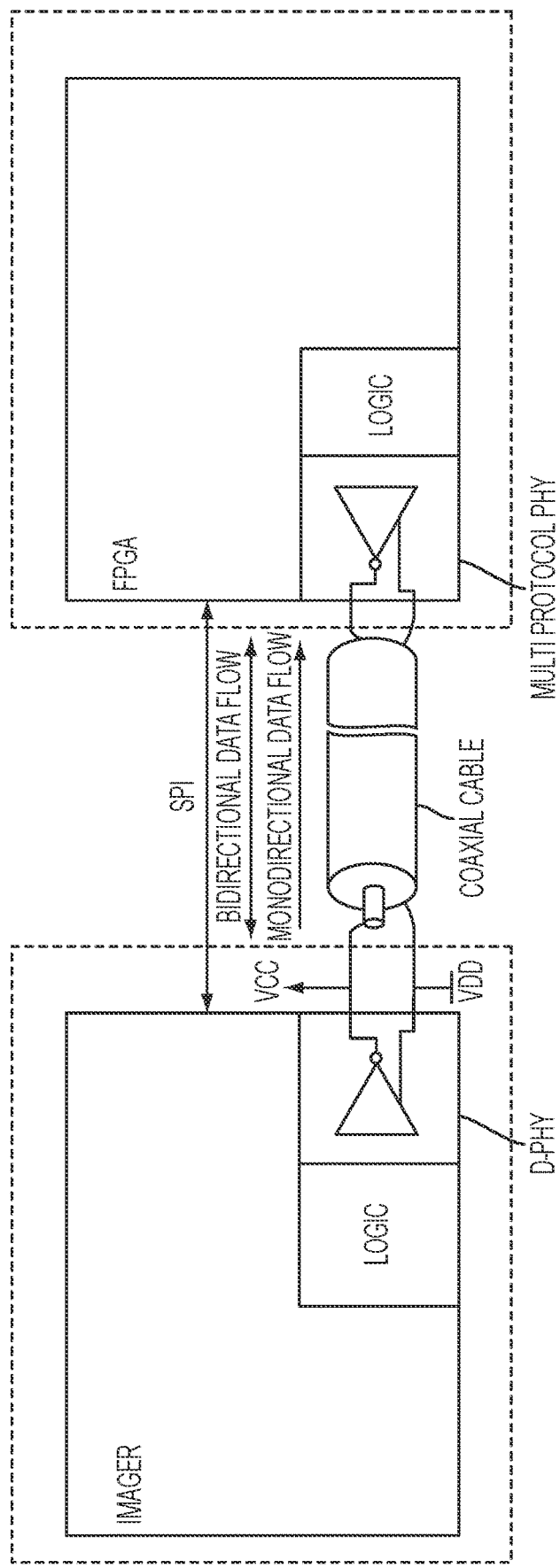
FIGS. 5A and 5B are schematics of other vision system wiring connections between an imager and a processor or data receiving device comprising a coaxial cable connection in accordance with the present invention.
Figure 5B:
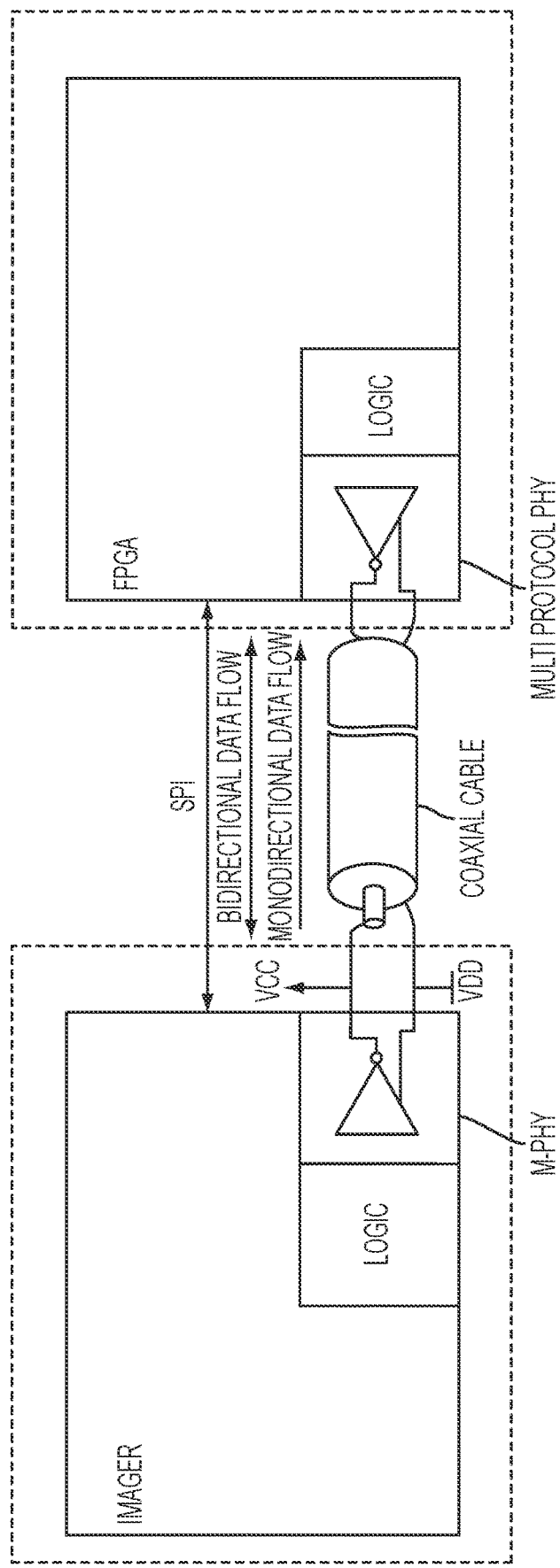
Figure 6A:
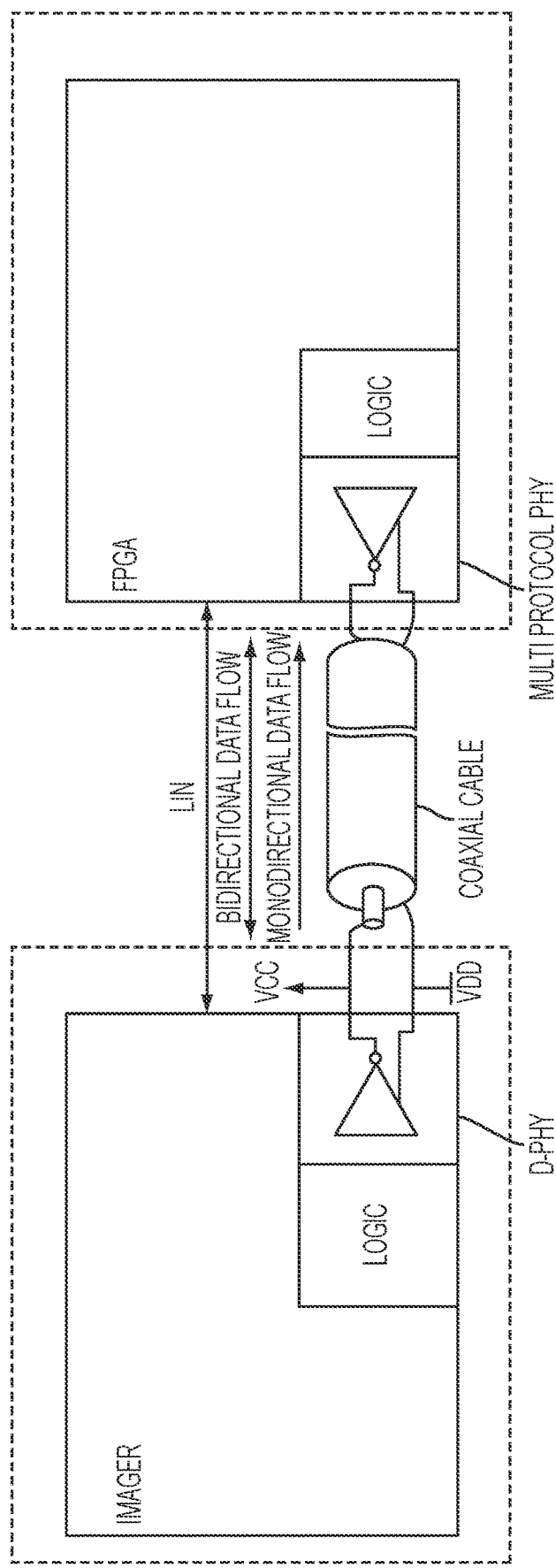
FIGS. 6A and 6B are schematics of other vision system wiring connections between an imager and a processor or data receiving device comprising a coaxial cable connection in accordance with the present invention.
Figure 6B:
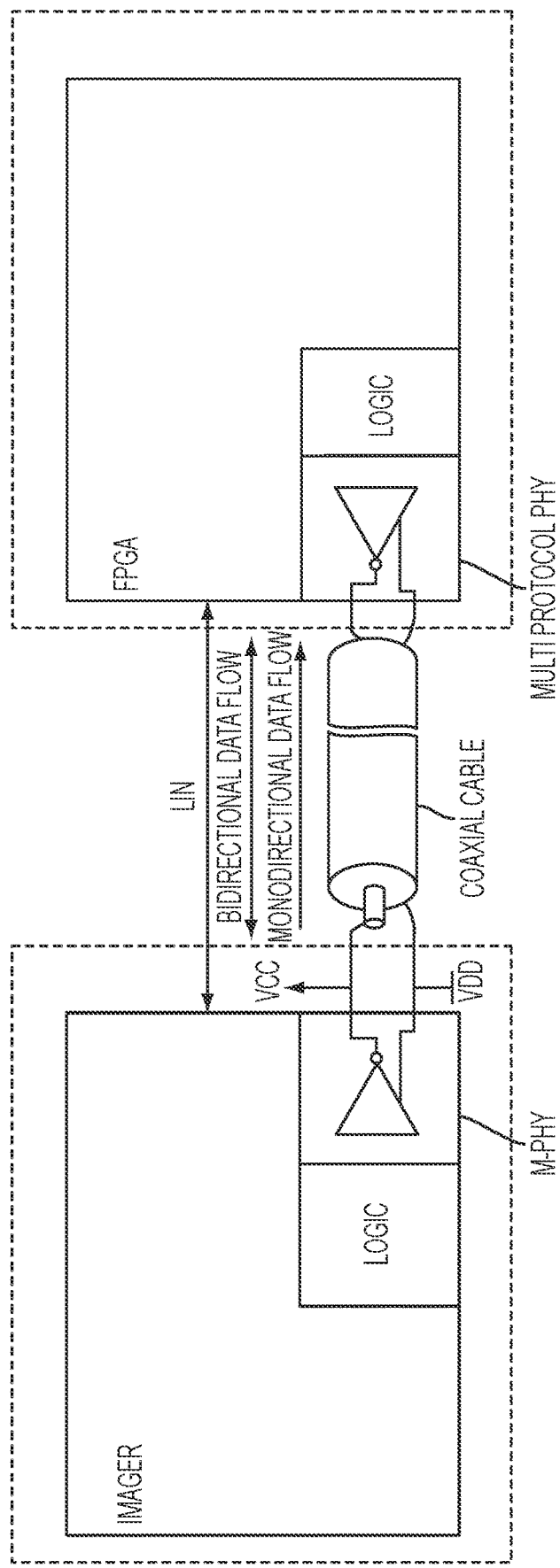
Figure 7A:
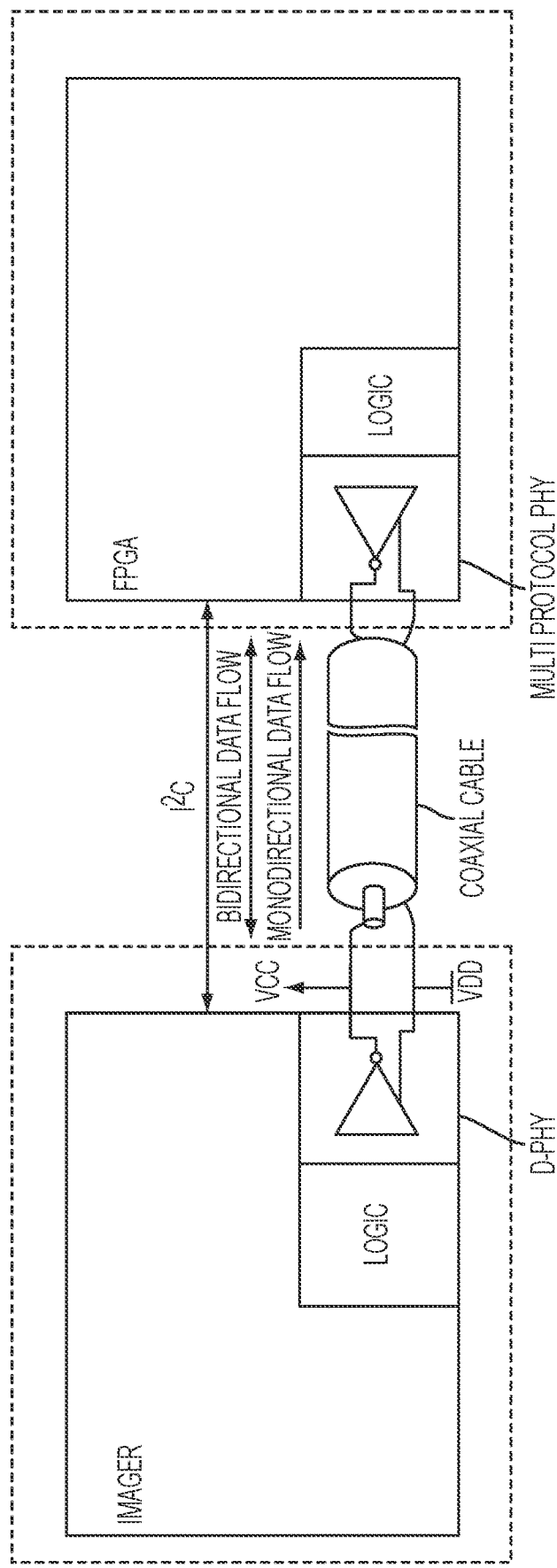
FIGS. 7A and 7B are schematics of other vision system wiring connections between an imager and a processor or data receiving device comprising a coaxial cable connection in accordance with the present invention.
Figure 7B:
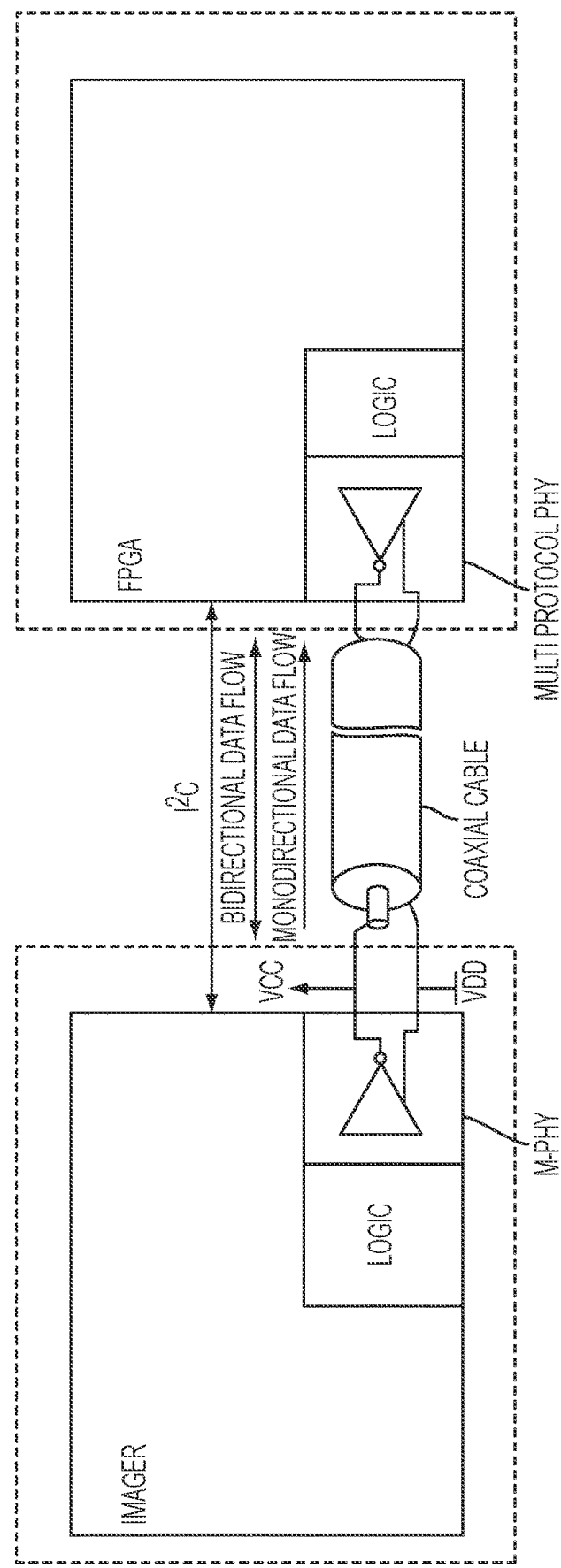
Figure 8A:
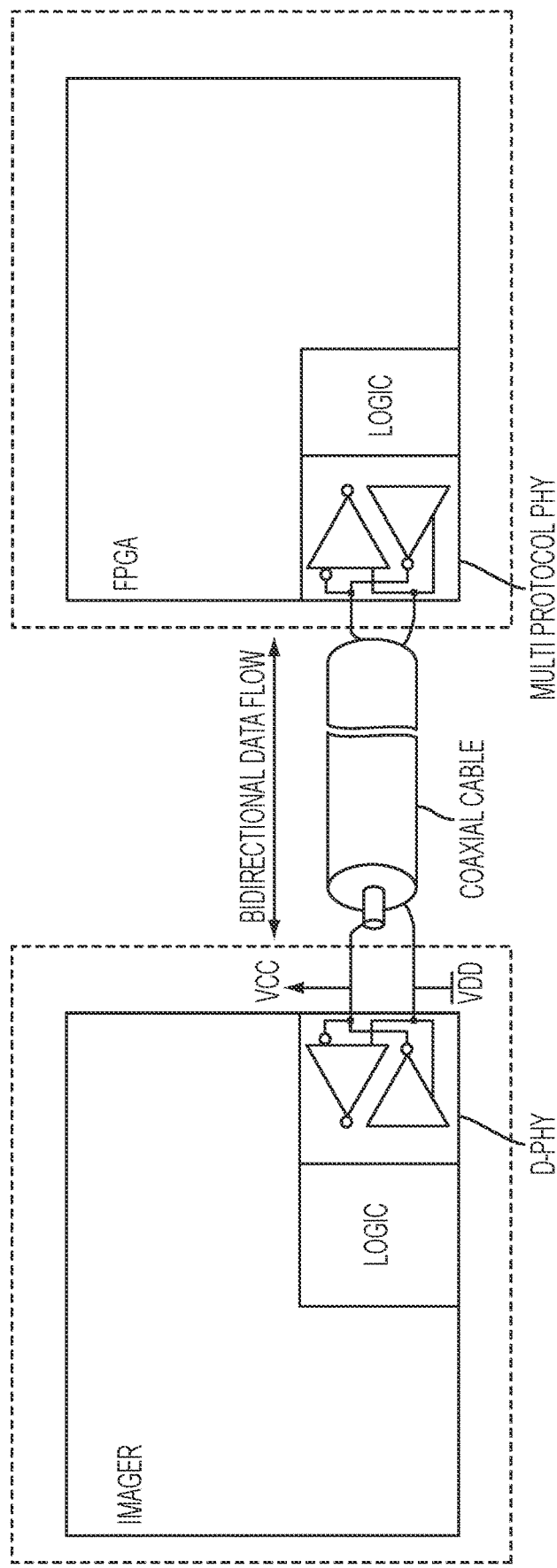
FIGS. 8A and 8B are schematics of other vision system wiring connections between an imager and a processor or data receiving device comprising a coaxial cable connection in accordance with the present invention.
Figure 8B:
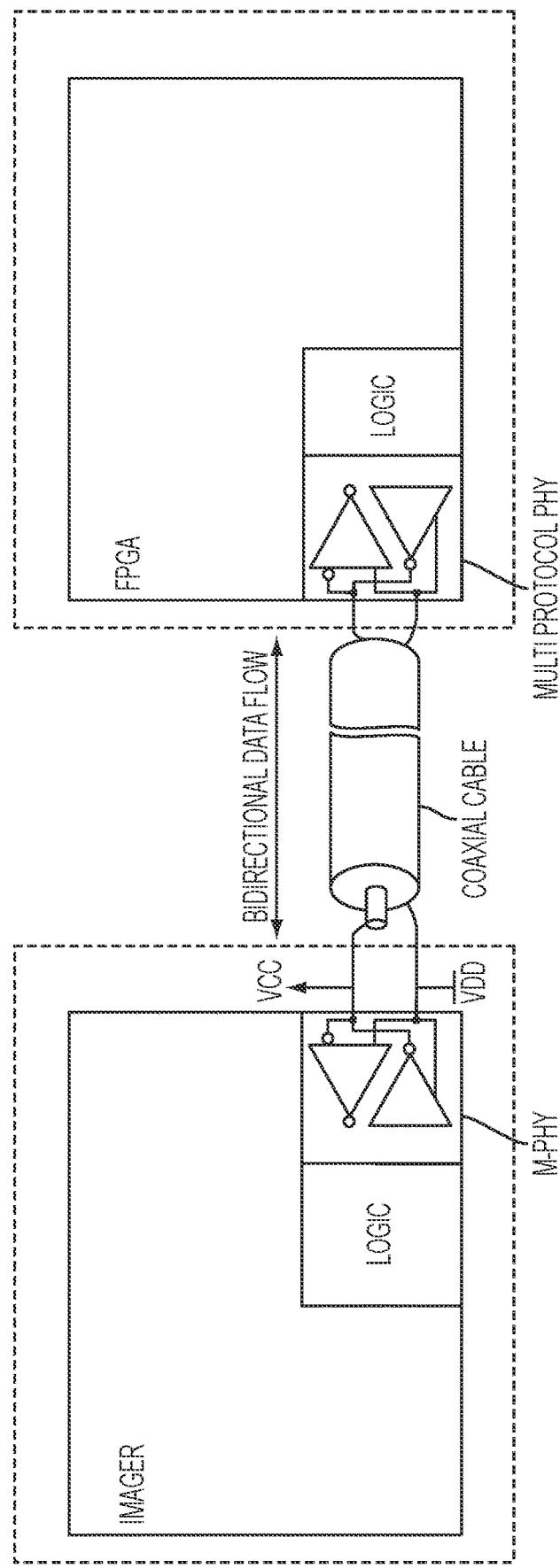

Referring now to the drawings and the illustrative embodiments depicted therein, a vehicle 10 includes an imaging system or vision system 12 that includes one or more imaging sensors or cameras (such as a rearward facing imaging sensor or camera 14a and/or a forwardly facing camera 14b at the front (or at the windshield) of the vehicle, and/or a sidewardly/rearwardly facing camera 14c, 14b at the sides of the vehicle), which capture images exterior of the vehicle, with the cameras having a lens for focusing images at or onto an imaging array or imaging plane of the camera (FIG. 1). The vision system 12 is operable to process image data captured by the cameras and may provide displayed images at a display device 16 for viewing by the driver of the vehicle. Optionally, the vision system may process image data to detect objects, such as objects to the rear of the subject or equipped vehicle during a reversing maneuver, or such as approaching or following vehicles or vehicles at a side lane adjacent to the subject or equipped vehicle or the like.

Automotive cameras use data transfer interfaces that may be integrated in the camera's PCB circuits for communicating to devices or components of a vehicle vision system that are exterior or remote from the camera. Such automotive cameras do not use data transfer interfaces that are integrated in or to the camera's imager or imaging array for communicating to devices or components of a vehicle vision system that are exterior or remote from the camera. As described in International Publication No. WO 2013/081985, which is hereby incorporated herein by reference in its entirety, suggests to use imager integrated data decoders and drivers for image data transfer.

There are several Camera Serial Interface standards from the MIPI Alliance. The latest Standard is CSI-3 besides CSI-1 and CSI-2. All are meant for transfer of image data over short distances such as across a PCB. A typical use case is to interconnect a mobile phone camera with the mobile phone image data engine across a mobile phones PCB lines. Data lines and clock signals are typically mono directional, and the CCI control link works bidirectional. That means that most of the data are flowing from the imager to the data engine. The data rate is specified to be from 1 Gbps up to 6 Gbps. See, for example, the Camera Interface Specifications on the MIPI Alliance® website: [http://www.mipi.org/specifications/camera-interface#CSI3].

The present invention utilizes, but is not limited to, an imager-based MIPI D-PHY or M-PHY (and parts of CSI x) for automotive camera image data transfer to remote image processing devices, such as to a compartment display, compartment projector, head unit or ECU/MCU. MIPI is an interconnect protocol offering several key advantages: strong modularity allowing minimizing power but also reaching high bandwidth when necessary (such as 6 Gbps, or 12 Gbps or the like), a guaranteed interoperability between an Application Processor and peripheral IC coming from different sources (such as camera controllers (CMOS image sensors), display controller, RF modem, audio codec and the like). MIPI is a bi-directional high speed serial differential signaling protocol, power consumption optimized and dedicated to mobile devices, and can be used to interface chips within the system, at the board level. It uses a controller (digital) and a mixed signal PHY. The D-PHY technology uses, for example, two clock wires per direction plus two signal wires per lane and per direction. For example a D-PHY might use two wires for the clock and four wires (two lanes) for the data in the forward direction, but two wires for the clock and six wires (three lanes) for the data in the reverse direction. Data traffic in the forward and reverse directions are totally independent at this level of the protocol stack. The preferred solution may use one differential data line (LVDS), which may be bidirectional. The back channel is used for control. Optionally, a monodirectional LVDS interface may be used, whereby the control channel may be embodied by a separate camera communication interface, such as a I2C, UART, LIN, CAN or SPI interface or the like. Optionally, a LVDS converter may come into use. As an alternative option, there may be an optical data line in use and having electrical to optical signal converters (sending node) and optical to electrical signal converters (receiving node), such as described, for example, on Meticom's website: http://www.meticom.com/page3/page31/DPHY_to_Optics.html.

In either case, the imager may have an additional logic for coping with the prolonged line length by using error correction, error and link status checking and for encoding the image data stream in a DC-balanced format (such as, for example, 8b10b encoding), either with or without additional parity or error correction information. The preferred embodiment of the image data receiving device may be a Field-Programmable Gate Array (FPGA) comprising a multi standard (multiple protocols, multiple voltages, multiple (en-)coding schemes) PHY and parity processing logic (beside other functions). Optionally, error correction and/or error and link status checking may be done on the multi standard PHY side. Optionally, the present invention may use shielded (STP) or unshielded (UTP) twisted pair lines (such as shown in FIGS. 2A, 2B, 3A and 3B) or coaxial cable for transferring LVDS (such as shown in the embodiments of FIGS. 4A, 4B, 5A, 5B, 6A, 6B, 7A, 7B, 8A and 8B). Optionally, the camera's DC power supply may run over the same lines as the LVDS provided by the image receiving device, such as by utilizing aspects of the systems described in International Publication No. WO 2013/043661, which is hereby incorporated herein by reference in its entirety.

Optionally, the signal may be modulated to and transferred via an analog carrier wave by any kind of signal modulation (AM, FM, QAM or the like). The modulator may be a frequency adder (or mixer), and the demodulation at the corresponding other end may be a frequency filter, such as by utilizing aspects of the systems described in U.S. provisional application Ser. No. 61/833,080, filed Jun. 10, 2013, which is hereby incorporated herein by reference in its entirety. Also, as such as described in U.S. provisional application Ser. No. 61/833,080, the data line may comprise a coaxial cable. Optionally, the same cable may carry also DC power (supply). Optionally, there may be one or two carrier each for each MIPI D-PHY signal of optionally one imager each or several multiplexed to less carriers or bandwidths (time-division multiplex, space-division multiplex, frequency-division multiplex).

The system may find use of aspects described in International Publication No. WO 2013/081985 (which is hereby incorporated herein by reference in its entirety), suggesting several combinations of video data and camera control linking in between cameras, head units, bus gate way nodes, image processing ECUs and/or auxiliary devices such as like smart phones or the like.

The system includes an image processor operable to process image data captured by the camera or cameras, such as for detecting objects or other vehicles or pedestrians or the like in the field of view of one or more of the cameras. For example, the image processor may comprise an EyeQ2 or EyeQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/0116043; WO 2012/0145313; WO 2012/0145501; WO 2012/145818; WO 2012/145822; WO 2012/158167; WO 2012/075250; WO 2012/0116043; WO 2012/0145501; WO 2012/154919; WO 2013/019707; WO 2013/016409; WO 2013/019795; WO 2013/067083; WO 2013/070539; WO 2013/043661; WO 2013/048994; WO 2013/063014, WO 2013/081984; WO 2013/081985; WO 2013/074604; WO 2013/086249; WO 2013/103548; WO 2013/109869; WO 2013/123161; WO 2013/126715; WO 2013/043661 and/or WO 2013/158592, and/or U.S. patent application Ser. No. 14/169,329, filed Jan. 31, 2014, and published on Aug. 7, 2014 as U.S. patent publication No. US-2014-0218529; Ser. No. 14/169,328, filed Jan. 31, 2014, now U.S. Pat. No. 9,092,986; Ser. No. 14/163,325, filed Jan. 24, 2014, and published on Jul. 31, 2014 as U.S. patent publication No. US-2014/0211009; Ser. No. 14/159,772, filed Jan. 21, 2014, now U.S. Pat. No. 9,068,390; Ser. No. 14/107,624, filed Dec. 16, 2013, now U.S. Pat. No. 9,140, 789; Ser. No. 14/102,981, filed Dec. 11, 2013, now U.S. Pat. No. 9,558,409; Ser. No. 14/102,980, filed Dec. 11, 2013, and published on Jun. 19, 2014 as U.S. patent publication No. US-2014/0168437; Ser. No. 14/098,817, filed Dec. 6, 2013, and published on Jun. 19, 2014 as U.S. patent publication No. 2014/0168415; Ser. No. 14/097,581, filed Dec. 5, 2013, now U.S. Pat. No. 9,481,301; Ser. No. 14/093,981, filed Dec. 2, 2013, now U.S. Pat. No. 8,917,169; Ser. No. 14/093,980, filed Dec. 2, 2013, now U.S. Pat. No. 10,025,994; Ser. No. 14/082,573, filed Nov. 18, 2013, now U.S. Pat. No. 9,743, 002; Ser. No. 14/082,574, filed Nov. 18, 2013, now U.S. Pat. No. 9,307,640; Ser. No. 14/082,575, filed Nov. 18, 2013, now U.S. Pat. No. 9,090,234; Ser. No. 14/082,577, filed Nov. 18, 2013, now U.S. Pat. No. 8,818,042; Ser. No. 14/071,086, filed Nov. 4, 2013, now U.S. Pat. No. 8,886, 401; Ser. No. 14/076,524, filed Nov. 11, 2013, now U.S. Pat. No. 9,077,962; Ser. No. 14/052,945, filed Oct. 14, 2013, now U.S. Pat. No. 9,707,896; Ser. No. 14/046,174, filed Oct. 4, 2013, now U.S. Pat. No. 9,723,272; Ser. No. 14/016,790, filed Oct. 3, 2013, now U.S. Pat. No. 9,761,142; Ser. No. 14/036,723, filed Sep. 25, 2013, now U.S. Pat. No. 9,446, 713; Ser. No. 14/016,790, filed Sep. 3, 2013, now U.S. Pat. No. 9,761,142; Ser. No. 14/001,272, filed Aug. 23, 2013, now U.S. Pat. No. 9,233,641; Ser. No. 13/970,868, filed Aug. 20, 2013, now U.S. Pat. No. 9,365,162; Ser. No. 13/964,134, filed Aug. 12, 2013, now U.S. Pat. No. 9,340, 227; Ser. No. 13/942,758, filed Jul. 16, 2013, and published Jan. 23, 2014 as U.S. patent publication No. US-2014/ 0025240; Ser. No. 13/942,753, filed Jul. 16, 2013, and published Jan. 30, 2014 as U.S. patent publication No. US-2014/0028852; Ser. No. 13/927,680, filed Jun. 26, 2013, and published Jan. 2, 2014 as U.S. patent publication No. US-2014/005907; Ser. No. 13/916,051, filed Jun. 12, 2013, now U.S. Pat. No. 9,077,098; Ser. No. 13/894,870, filed May 15, 2013, and published Nov. 28, 2013 as U.S. patent publication No. US-2013-0314503; Ser. No. 13/887,724, filed May 6, 2013, now U.S. Pat. No. 9,670,895; Ser. No. 13/852,190, filed Mar. 28, 2013, and published Aug. 29, 2013 as U.S. patent publication No. US-2013-0222593; Ser. No. 13/851,378, filed Mar. 27, 2013, now U.S. Pat. No. 9,319,637; Ser. No. 13/848,796, filed Mar. 22, 2012, and published Oct. 24, 2013 as U.S. patent publication No. US-2013-0278769; Ser. No. 13/847,815, filed Mar. 20, 2013, and published Oct. 21, 2013 as U.S. patent publication No. US-2013-0286193; Ser. No. 13/800,697, filed Mar. 13, 2013, and published Oct. 3, 2013 as U.S. patent publication No. US-2013-0258077; Ser. No. 13/785,099, filed Mar. 5, 2013, now U.S. Pat. No. 9,565,342; Ser. No. 13/779,881, filed Feb. 28, 2013, now U.S. Pat. No. 8,694,224; Ser. No. 13/774,317, filed Feb. 22, 2013, now U.S. Pat. No. 9,269, 263; Ser. No. 13/774,315, filed Feb. 22, 2013, and published Aug. 22, 2013 as U.S. patent publication No. US-2013- 0215271; Ser. No. 13/681,963, filed Nov. 20, 2012, now U.S. Pat. No. 9,264,673; Ser. No. 13/660,306, filed Oct. 25, 2012, now U.S. Pat. No. 9,146,898; Ser. No. 13/653,577, filed Oct. 17, 2012, now U.S. Pat. No. 9,174,574; and/or Ser. No. 13/534,657, filed Jun. 27, 2012, and published Jan. 3, 2013 as U.S. patent publication No. US-2013-0002873, and/or U.S. provisional applications, Ser. No. 61/935,485, filed Feb. 4, 2014; Ser. No. 61/935,057, filed Feb. 3, 2014; Ser. No. 61/935,056, filed Feb. 3, 2014; Ser. No. 61/935,055, filed Feb. 3, 2014; Ser. No. 61/931,811, filed Jan. 27, 2014; Ser. No. 61/919,129, filed Dec. 20, 2013; Ser. No. 61/919, 130, filed Dec. 20, 2013; Ser. No. 61/919,131, filed Dec. 20, 2013; Ser. No. 61/919,147, filed Dec. 20, 2013; Ser. No. 61/919,138, filed Dec. 20, 2013, Ser. No. 61/919,133, filed Dec. 20, 2013; Ser. No. 61/918,290, filed Dec. 19, 2013; Ser. No. 61/915,218, filed Dec. 12, 2013; Ser. No. 61/912,146, filed Dec. 5, 2013; Ser. No. 61/911,666, filed Dec. 4, 2013; Ser. No. 61/911,665, filed Dec. 4, 2013; Ser. No. 61/905,461, filed Nov. 18, 2013; Ser. No. 61/905,462, filed Nov. 18, 2013; Ser. No. 61/901,127, filed Nov. 7, 2013; Ser. No. 61/895,610, filed Oct. 25, 2013; Ser. No. 61/895,609, filed Oct. 25, 2013; Ser. No. 61/879,837, filed Sep. 19, 2013; Ser. No. 61/879,835, filed Sep. 19, 2013; Ser. No. 61/878,877, filed Sep. 17, 2013; Ser. No. 61/875,351, filed Sep. 9, 2013; Ser. No. 61/869,195, filed. Aug. 23, 2013; Ser. No. 61/864, 835, filed Aug. 12, 2013; Ser. No. 61/864,836, filed Aug. 12, 2013; Ser. No. 61/864,837, filed Aug. 12, 2013; Ser. No. 61/864,838, filed Aug. 12, 2013; Ser. No. 61/856,843, filed Jul. 22, 2013, Ser. No. 61/845,061, filed Jul. 11, 2013; Ser. No. 61/844,630, filed Jul. 10, 2013; Ser. No. 61/844,173, filed Jul. 9, 2013; Ser. No. 61/844,171, filed Jul. 9, 2013; Ser. No. 61/842,644, filed Jul. 3, 2013; Ser. No. 61/840,542, filed Jun. 28, 2013; Ser. No. 61/838,619, filed Jun. 24, 2013; Ser. No. 61/838,621, filed Jun. 24, 2013; Ser. No. 61/837,955, filed Jun. 21, 2013; Ser. No. 61/836,900, filed Jun. 19, 2013; Ser. No. 61/836,380, filed Jun. 18, 2013; Ser. No. 61/833,080, filed Jun. 10, 2013; Ser. No. 61/830,375, filed Jun. 3, 2013; Ser. No. 61/830,377, filed Jun. 3, 2013; Ser. No. 61/825,752, filed May 21, 2013; Ser. No. 61/825,753, filed May 21, 2013; Ser. No. 61/823,648, filed May 15, 2013; Ser. No. 61/823,644, filed May 15, 2013; Ser. No. 61/821,922, filed May 10, 2013; Ser. No. 61/819,835, filed May 6, 2013; Ser. No. 61/819,033, filed May 3, 2013; Ser. No. 61/816,956, filed Apr. 29, 2013; Ser. No. 61/815,044, filed Apr. 23, 2013; Ser. No. 61/814,533, filed Apr. 22, 2013; Ser. No. 61/813,361, filed Apr. 18, 2013; Ser. No. 61/810,407, filed Apr. 10, 2013; Ser. No. 61/808,930, filed Apr. 5, 2013; Ser. No. 61/806,674, filed Mar. 29, 2013; Ser. No. 61/793,592, filed Mar. 15, 2013; Ser. No. 61/772,015, filed Mar. 4, 2013; Ser. No. 61/772,014, filed Mar. 4, 2013; Ser. No. 61/770,051, filed Feb. 27, 2013; and/or Ser. No. 61/766,883, filed Feb. 20, 2013, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. patent application Ser. No. 13/202,005, filed Aug. 17, 2011, now U.S. Pat. No. 9,126,525, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and 6,824,281, and/or International Publication Nos. WO 2010/099416; WO 2011/028686 and/or WO 2013/016409, and/or U.S. Pat. Publication No. US 2010-0020170, and/or U.S. patent application Ser. No. 13/534,657, filed Jun. 27, 2012, and published Jan. 3, 2013 as U.S. patent publication No. US-2013-0002873, which are all hereby incorporated herein by reference in their entireties. The camera or cameras may comprise any suitable cameras or imaging sensors or camera modules, and may utilize aspects of the cameras or sensors described in U.S. patent application Ser. No. 13/260,400, filed Sep. 26, 2011, now U.S. Pat. No. 8,542,451, and/or U.S. Pat. Nos. 7,965,336 and/or 7,480,149, and/or U.S. Pat. Publication No. US-2009-0244361, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; 7,720,580 and/or 7,965,336, and/or International Publication Nos. WO 2009/036176 and/or WO 2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,720,580; 7,038,577; 5,929,786 and/or 5,786,772, and/or U.S. patent application Ser. No. 11/239,980, filed Sep. 30, 2005, now U.S. Pat. No. 7,881,496, and/or U.S. provisional applications, Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. Pat. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. No. 7,255,451 and/or U.S. Pat. No. 7,480,149; and/or U.S. patent application Ser. No. 12/578,732, filed Oct. 14, 2009, now U.S. Pat. No. 9,487,144, and/or U.S. Publication No. US-2006-0061008, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011, now U.S. Pat. No. 9,264,672, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. Pat. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. patent application Ser. No. 13/333,337, filed Dec. 21, 2011, now U.S. Pat. No. 9,264,672, which are hereby incorporated herein by reference in their entireties.

Optionally, a video mirror display may be disposed rearward of and behind the reflective element assembly of an interior rearview mirror assembly of the vehicle and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. Pat. Publication Nos. US-2006-0061008 and/or US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or a backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036 and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and/or 6,124,886, and/or U.S. Pat. Publication No. US-2006-0050018, which are hereby incorporated herein by reference in their entireties.

Changes and modifications to the specifically described embodiments may be carried out without departing from the principles of the present invention, which is intended to be limited only by the scope of the appended claims as interpreted according to the principles of patent law.

The invention claimed is:

1. A vehicular vision system, the vehicular vision system comprising:
   an electronic control unit disposed at a vehicle equipped with the vehicular vision system;
   wherein the electronic control unit comprises an image processor;
   a rear backup camera disposed at a rear portion of the equipped vehicle and viewing rearward of the equipped vehicle, the rear backup camera comprising an imager that captures image data;
   wherein the imager of the rear backup camera comprises at least one million photosensors arranged in a two dimensional array of photosensors having multiple rows and multiple columns;
   a cable, wherein the cable is electrically connected (i) at an electrical connector of the electronic control unit and (ii) at an electrical connector of the rear backup camera;
   wherein the cable comprises shielded twisted pair lines;
   wherein the cable carries DC power from the electronic control unit to the rear backup camera;
   wherein the cable carries, from the electronic control unit to the rear backup camera, data used for control of the imager of the rear backup camera;
   wherein the cable carries image data captured by the imager of the rear backup camera to the electronic control unit; and
   wherein image data carried by the cable to the electronic control unit is processed at the electronic control unit.

2. The vehicular vision system of claim 1, wherein transfer via the cable of image data captured by the imager of the rear backup camera to the electronic control unit is at a data rate of at least one gigabit per second.

3. The vehicular vision system of claim 1, wherein transfer via the cable of image data captured by the imager of the rear backup camera to the electronic control unit is at a data rate less than six gigabits per second.

4. The vehicular vision system of claim 1, wherein the rear backup camera is part of a birds-eye view system of the equipped vehicle.

5. The vehicular vision system of claim 1, wherein the cable has a length, and wherein data transfer via the cable between the rear backup camera and the electronic control unit utilizes error correction to cope with the length of the cable.

6. The vehicular vision system of claim 1, wherein data transfer via the cable between the rear backup camera and the electronic control unit utilizes status checking.

7. The vehicular vision system of claim 1, wherein data transfer via the cable between the rear backup camera and the electronic control unit comprises encoding of captured image data for communication via the cable.

8. The vehicular vision system of claim 1, wherein the rear backup camera uses an MIPI D-PHY interface for interfacing with the electronic control unit, and wherein the electronic control unit uses an MIPI D-PHY interface for interfacing with the rear backup camera.

9. The vehicular vision system of claim 8, wherein the MIPI D-PHY interface comprises a serializer and a deserializer.

10. The vehicular vision system of claim 1, wherein the electronic control unit comprises a multi standard transceiver.

11. The vehicular vision system of claim 1, wherein data carried from the electronic control unit to the rear backup camera via the cable utilizes a high speed serial differential signaling protocol.

12. The vehicular vision system of claim 1, wherein data transfer via the cable between the rear backup camera and the electronic control unit utilizes parity processing.

13. The vehicular vision system of claim 1, wherein the image processor comprises an image processing chip operable to image process captured image data.

14. The vehicular vision system of claim 13, wherein responsive to image processing at the electronic control unit, an object present exterior of the equipped vehicle is detected.

15. The vehicular vision system of claim 14, wherein responsive to detection of the object present exterior of the equipped vehicle, a driver of the equipped vehicle is alerted.

16. The vehicular vision system of claim 1, wherein the electronic control unit comprises a serializer and a deserializer.

17. A vehicular vision system, the vehicular vision system comprising:
an electronic control unit disposed at a vehicle equipped with the vehicular vision system;
wherein the electronic control unit comprises an image processor;
a forward-viewing camera disposed at an in-cabin side of a windshield of the equipped vehicle and viewing forward through the windshield of the equipped vehicle, the forward-viewing camera comprising an imager that captures image data;
wherein the imager of the forward-viewing camera comprises at least one million photosensors arranged in a two dimensional array of photosensors having multiple rows and multiple columns;
a cable, wherein the cable is electrically connected (i) at an electrical connector of the electronic control unit and (ii) at an electrical connector of the forward-viewing camera;
wherein the cable comprises one selected from the group consisting of (i) a single core cable and (ii) shielded twisted pair lines;
wherein the cable carries DC power from the electronic control unit to the forward-viewing camera;
wherein the cable carries, from the electronic control unit to the forward-viewing camera, data used for control of the imager of the forward-viewing camera;
wherein the cable carries image data captured by the imager of the forward-viewing camera to the electronic control unit; and
wherein image data carried by the cable to the electronic control unit is processed at the electronic control unit.

18. The vehicular vision system of claim 17, wherein transfer via the cable of image data captured by the imager of the forward-viewing camera to the electronic control unit is at a data rate of at least one gigabit per second.

19. The vehicular vision system of claim 17, wherein transfer via the cable of image data captured by the imager of the forward-viewing camera to the electronic control unit is at a data rate less than six gigabits per second.

20. The vehicular vision system of claim 17, wherein the cable has a length, and wherein data transfer via the cable between the forward-viewing camera and the electronic control unit utilizes error correction to cope with the length of the cable.

21. The vehicular vision system of claim 17, wherein data transfer via the cable between the forward-viewing camera and the electronic control unit utilizes status checking.

22. The vehicular vision system of claim 17, wherein the image processor comprises an image processing chip operable to image process captured image data.

23. The vehicular vision system of claim 22, wherein responsive to image processing at the electronic control unit, an object present exterior of the equipped vehicle is detected.

24. The vehicular vision system of claim 23, wherein, responsive to detection of the object present exterior of the equipped vehicle, a driver of the equipped vehicle is alerted.

25. The vehicular vision system of claim 17, wherein data transfer via the cable between the forward-viewing camera and the electronic control unit comprises encoding of captured image data for communication via the cable.

26. The vehicular vision system of claim 17, wherein the forward-viewing camera uses an MIPI D-PHY interface for interfacing with the electronic control unit, and wherein the electronic control unit uses an MIPI D-PHY interface for interfacing with the forward-viewing camera.

27. The vehicular vision system of claim 26, wherein the MIPI D-PHY interface comprises a serializer and a deserializer.

28. The vehicular vision system of claim 17, wherein the electronic control unit comprises a multi standard transceiver.

29. The vehicular vision system of claim 17, wherein data carried from the electronic control unit to the forward-viewing camera via the cable utilizes a high speed serial differential signaling protocol.

30. The vehicular vision system of claim 17, wherein data transfer via the cable between the forward-viewing camera and the electronic control unit utilizes parity processing.

31. The vehicular vision system of claim 17, wherein the electronic control unit comprises a serializer and a deserializer.

32. A vehicular vision system, the vehicular vision system comprising:
an electronic control unit disposed at a vehicle equipped with the vehicular vision system;
wherein the electronic control unit comprises an image processor;
wherein the electronic control unit comprises at least four electrical connectors;
at least four cameras disposed at the equipped vehicle, each camera of the at least four cameras comprising an imager that captures image data;
wherein the at least four cameras comprise (i) a forward-viewing camera disposed at the equipped vehicle, (ii) a rearward-viewing camera disposed at of the equipped vehicle, (iii) a driver side-viewing camera disposed at a driver side portion of the equipped vehicle and (iv) a passenger side-viewing camera disposed at a passenger side portion of the equipped vehicle;
wherein the imager of each camera of the at least four cameras comprises at least one million photosensors arranged in a two dimensional array of photosensors having multiple rows and multiple columns;

at least four cables, wherein each respective cable of the at least four cables is electrically connected (i) at a respective electrical connector of the at least four electrical connectors of the electronic control unit and (ii) at a respective electrical connector of a respective camera of the at least four cameras;

wherein each cable of the at least four cables comprises shielded twisted pair lines;

wherein each respective cable of the at least four cables carries DC power from the electronic control unit to the respective camera of the at least four cameras;

wherein each respective cable of the at least four cables carries, from the electronic control unit to the respective camera of the at least four cameras, data used for control of the imager of the respective camera of the at least four cameras;

wherein each respective cable of the at least four cables carries image data captured by the imager of the respective camera of the at least four cameras to the electronic control unit; and wherein image data carried by the respective cables to the electronic control unit is processed at the electronic control unit.

33. The vehicular vision system of claim 32, wherein transfer via the respective cable of image data captured by the imager of each camera of the at least four cameras to the electronic control unit is at a data rate of at least one gigabit per second.

34. The vehicular vision system of claim 32, wherein transfer via the respective cable of image data captured by the imager of each camera of the at least four cameras to the electronic control unit is at a data rate less than six gigabits per second.

35. The vehicular vision system of claim 32, wherein each cable of the at least four cables used has a length, and wherein data transfer via the respective cable between each camera of the at least four cameras and the electronic control unit utilizes error correction to cope with the length of the respective cable.

36. The vehicular vision system of claim 32, wherein data transfer via the respective cable between each camera of the at least four cameras and the electronic control unit utilizes status checking.

37. The vehicular vision system of claim 32, wherein data transfer via the respective cable between each camera of the at least four cameras and the electronic control unit comprises encoding of captured image data for communication via the respective cable.

38. The vehicular vision system of claim 32, wherein each camera of the at least four cameras uses an MIPI D-PHY interface for interfacing with the electronic control unit, and wherein the electronic control unit uses an MIPI D-PHY interface for interfacing with each respective camera of the at least four cameras.

39. The vehicular vision system of claim 38, wherein each MIPI D-PHY interface comprises a serializer and a deserializer.

40. The vehicular vision system of claim 32, wherein the electronic control unit comprises a multi standard transceiver.

41. The vehicular vision system of claim 32, wherein the image processor comprises an image processing chip operable to image process captured image data.

42. The vehicular vision system of claim 41, wherein, responsive to image processing at the electronic control unit, an object present exterior of the equipped vehicle is detected.

43. The vehicular vision system of claim 42, wherein responsive to detection of the object present exterior of the equipped vehicle, a driver of the equipped vehicle is alerted.

44. The vehicular vision system of claim 32, wherein data carried from the electronic control unit to the respective camera of the at least four cameras via the respective cable utilizes a high speed serial differential signaling protocol.

45. The vehicular vision system of claim 32, wherein data transfer via the respective cable between each camera of the at least four cameras and the electronic control unit utilizes parity processing.

46. The vehicular vision system of claim 32, wherein the electronic control unit comprises a serializer and a deserializer.

* * * * *